AMPLITUDE TO POSITION MODULATION CONVERTER
Filed Dec. 14, 1954 4 Sheets-Sheet 1
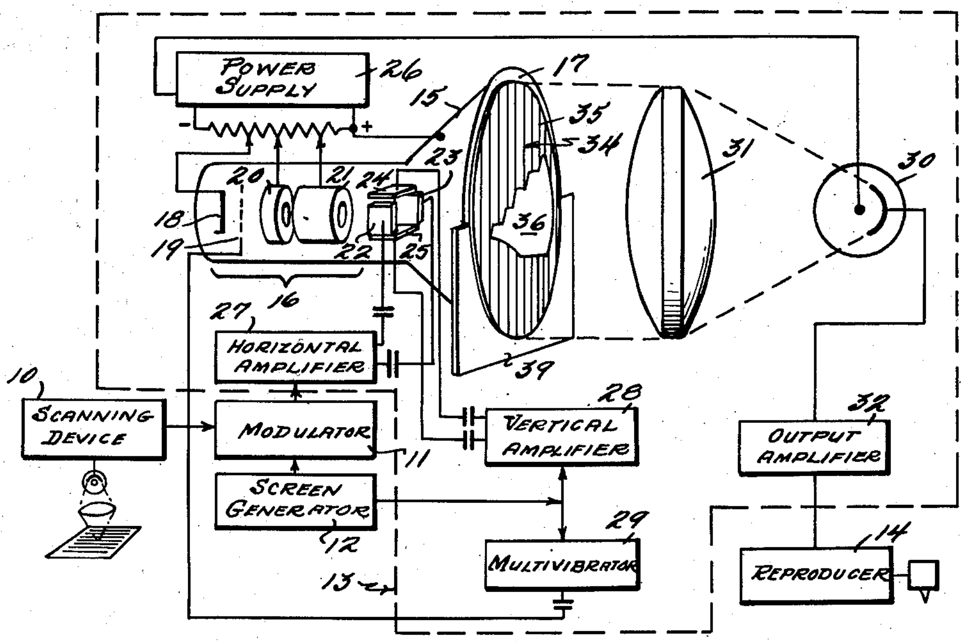
Fig. 1
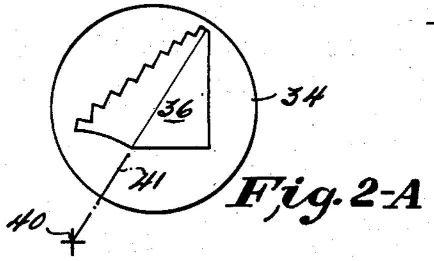
Fig. 2-A
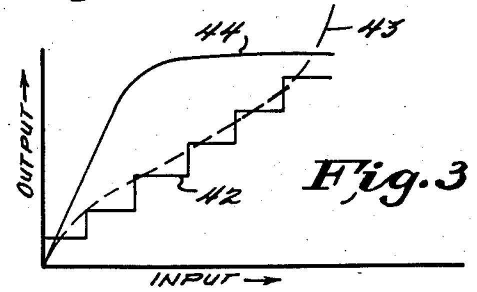
Fig. 3
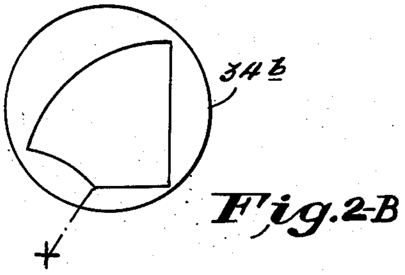
Fig. 2-B
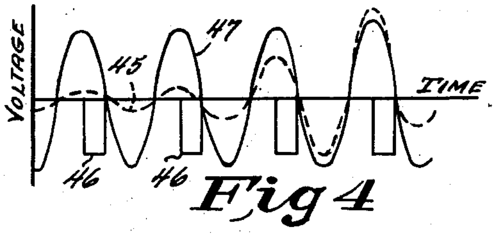
Fig 4
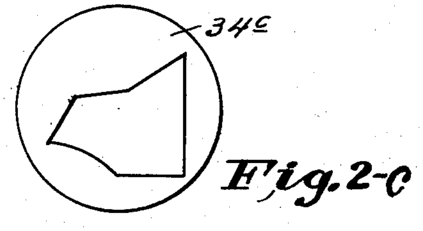
Fig. 2-C
INVENTOR
SAMUEL W. LEVINE,
BY Homer R. Montague
ATTORNEY AMPLITUDE TO POSITION MODULATION CONVERTER
Filed Dec. 14, 1954 4 Sheets-Sheet 2
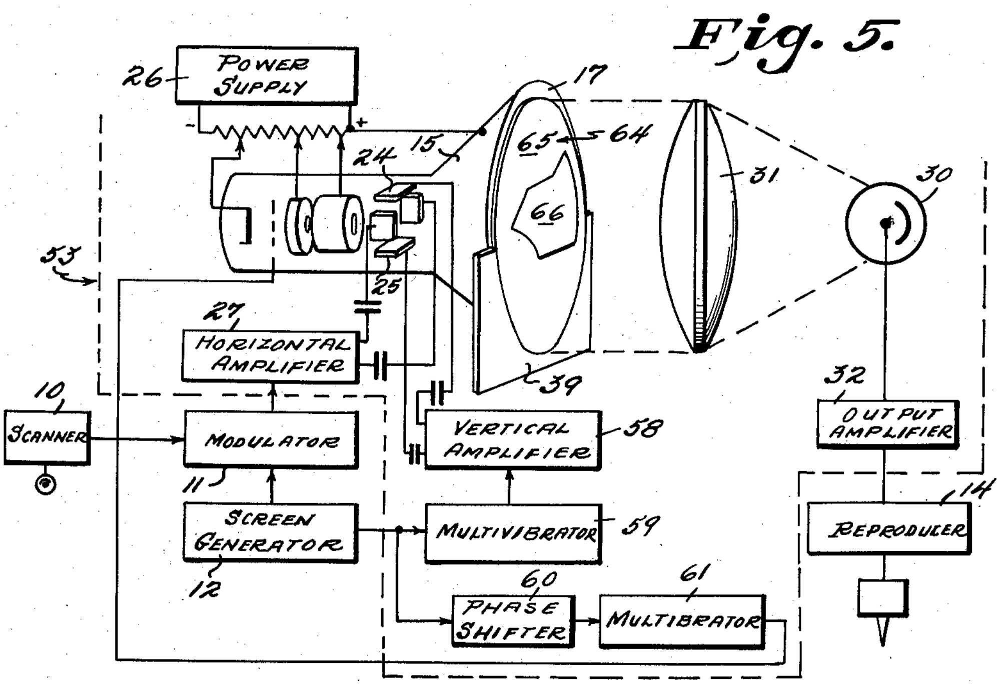
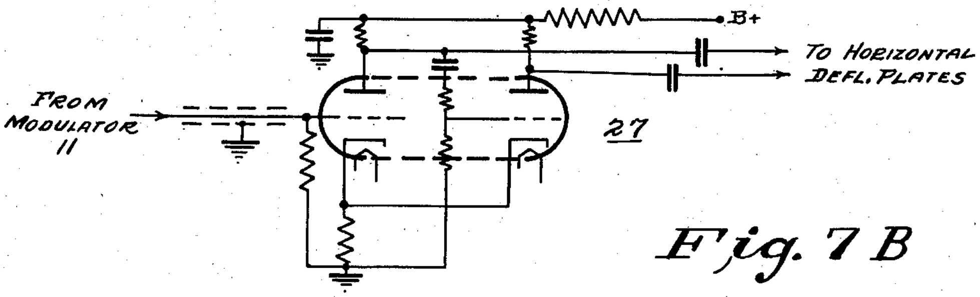
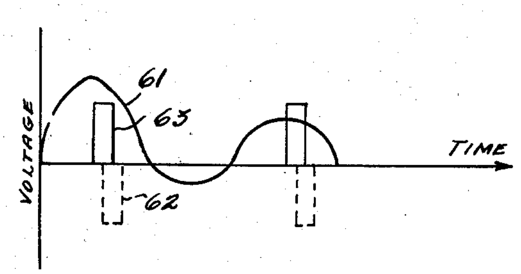
Fig. 6
INVENTOR
SAMUEL W. LEVINE
BY Homer R. Montague
ATTORNEY April 8, 1958 S. W. LEVINE 2,830,113
AMPLITUDE TO POSITION MODULATION CONVERTER
Filed Dec. 14, 1954 4 Sheets-Sheet 3
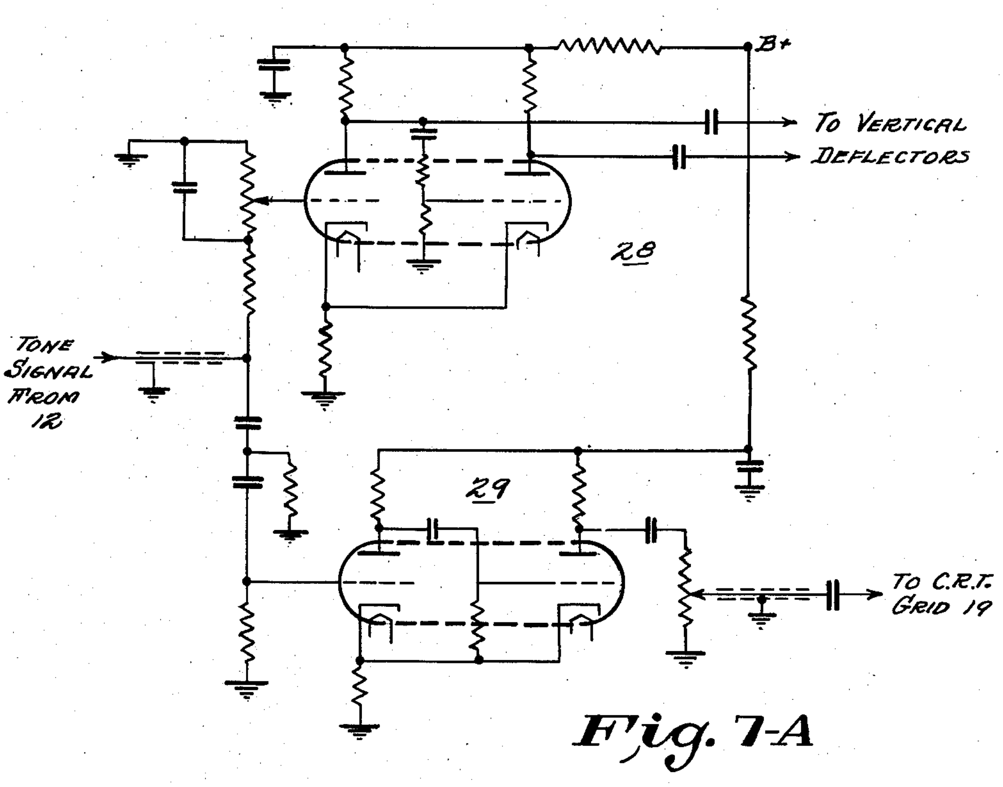
Fig. 7-A
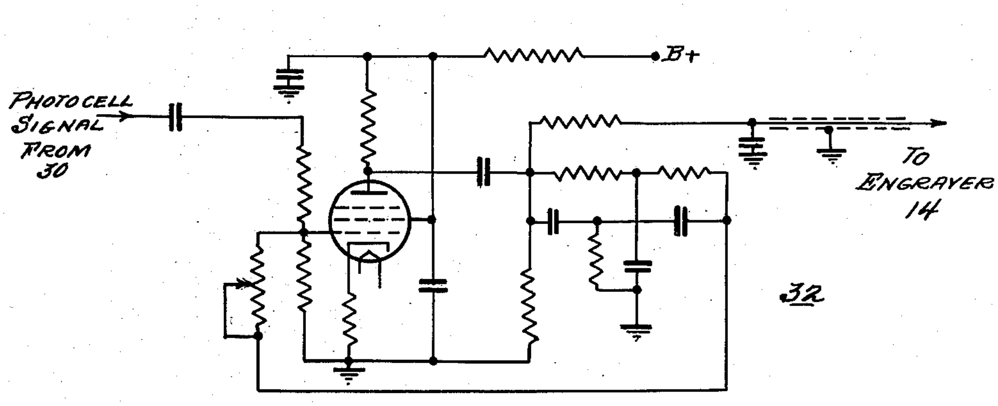
Fig. 7-C
INVENTOR
SAMUEL W. LEVINE
BY Homer R. Montague
ATTORNEY April 8, 1958 S. W. LEVINE 2,830,113

AMPLITUDE TO POSITION MODULATION CONVERTER

Filed Dec. 14, 1954 4 Sheets-Sheet 4

INVENTOR
SAMUEL W. LEVINE

BY Homer R Montague
ATTORNEY 2,830,113

AMPLITUDE TO POSITION MODULATION CONVERTER

Samuel W. Levine, New York, N. Y., assignor to Fairchild Camera and Instrument Corporation, a corporation of Delaware Application December 14, 1954, Serial No. 475,134
15 Claims. (Cl. 178—6.8)

This invention is directed to a new and improved facsimile system and to a tone control device which may be incorporated in such a system. More particularly, the facsimile system of the invention includes an electro-optical tone control system for modifying an electrical intelligence signal representative of the tone values of an original image, in accordance with a preselected functional pattern, to vary the tone values in a reproduced image and thus modify the optical impression created by the reproduced image. The tone control system itself is adaptable to a wide variety of uses and is not restricted to facsimile applications.

In many branches of the electronic art it is often desirable to modify signal information in accordance with some functional pattern or mathematical relationship, either analytical or arbitrary. For example, in the computer field, it is often desirable to "quantize" information, either to permit continuously varying analog type information to be handled by digital machinery or circuits, or to restore a precise digital form to digital information which has been degraded by passage through other circuits or apparatus. In communication work, it is sometimes necessary to convert continuously varying signals into pulses of varying amplitude, spacing, or time-position or to otherwise modify the amplitude characteristics of the signals. In optical or electron-optical systems it is frequently desirable or necessary to convert the output signal from a photocell or similar sensing device to a different form more suitable for the requirements of a reproduction device. This is particularly true in facsimile systems, in which it is often advantageous to "quantize" or otherwise modify the amplitude characteristics of an intelligence signal representative of tonal values in an original image, in order to achieve particular effects in a reproduction of that image.

A variety of highly specialized electrical circuits have been developed for such uses, but all have inherent disadvantages. For example, the circuitry and circuit parameters are usually quite different for different applications, requiring extensive knowledge of electrical circuit design before any particular application can be satisfied. The devices employed are generally complex in form and highly inflexible, so that any substantial change in the desired functional pattern to be followed in modifying the intelligence signal necessitates a complete redesign and reconstruction of the entire arrangement.

It has also been proposed to generate arbitrary functions by converting the light output of cathode ray tubes, after passing through suitable masks of variable area or optical density, to electrical values by means of a photocell. In such arrangements, the electron beam of the cathode ray tube is deflected in response to input signals, usually sinusoidal in form, so that the beam traverses the mask pattern in a predetermined raster to generate a particular output waveform. Devices of this type, such as that described in the article "Photoelectric waveform generator," by D. E. Sunstein, "Electronics," February 1949, pp. 100–103, have generally required relatively complex and delicate feedback networks, since operation of the entire arrangement is dependent upon the gain characteristics of a feedback loop between the photocell and the deflection system of the cathode ray tube. In addition, the accuracy of this type of system is dependent upon the uniformity of minute areas of the cathode ray tube screen, since the signal derived is determined by a fractional portion of the light produced by the beam at each point on the screen. Similar systems have been proposed in which specially shaped electron-opaque masks or electrodes are mounted within the cathode ray tube envelope and the electron beam energy passed through the mask is collected directly; these devices are, of course, much less flexible in operation than the electro-optical apparatus. Various approaches of this type are described in the book "Electronic Analog Computors," by Korn and Korn, McGraw-Hill, 1952, beginning at page 251.

In general, these prior proposals are not well suited to effecting operational changes in the shape of an arbitrary function expressed as a variation of voltages with time. That is, given a time series expressed or already available as a functional relationship between voltage and time, called for brevity an intelligence signal, it may be desired to produce an output function whose instantaneous amplitude is to be related to the original intelligence signal in accordance with a specifice functional pattern. Ordinary amplifiers can perform this type of transformation only when the relationship between the intelligence signal and the desired output signal can be specified in relatively simple mathematical terms, for instance as by a logarithmic transfer function or the like. Usually, the transfer or tone-control device requires a considerable investment in technical equipment which is suitable for no other purpose; moreover, such devices cannot ordinarily be employed where the functional control pattern is available only, for example, as a graphical or tabular set of values or as some other wholly arbitrary or irrational function. On the other hand, the somewhat more flexible electro-optical systems of the prior art are overly complex and delicate in operation and are not particularly well suited to operation by other than highly skilled personnel.

The present invention provides a transformation or tone-control system in which the essential nature of the output signal is determined by a single very simple element, a mask, which is interchangeable in the remainder of the apparatus and which can readily be laid out and fabricated by inexperienced personnel. The mask is inserted in the path of light emitted by a cathode ray tube, whereas the intelligence signal to be modified is applied to the deflection system of the tube. The intelligence signal is employed to position-modulate the electron beam of the tube; that is, the location of the beam as it sweeps the luminescent screen of the tube is instantaneously modified in accordance with the input intelligence signal to form an optical intelligence signal on the screen. The amount of light transmitted through the mask is determined by the configuration of an aperture or other light-transparent area in the mask, and may bear any desired functional relation to the input signal. This light is measured by a photocell and converted to an output signal related to the original intelligence signal in accordance with the functional pattern established by the transparent portion of the mask.

In another aspect of the invention, the tone-control system is incorporated in a facsimile system including a conventional photoelectronic scanner which generates an electrical signal representative of the tone values in an original image. This signal is applied to the tone-control system, which in turn is optically coupled to an image reproduction device adapted to develop a second image from the information translated through the tone-control apparatus. Thus, the transformation system may be employed to emphasize desired ranges of tonal values in accordance with a preselected functional pattern determined by the mask to modify the optical illusion and interpretability of the reproduced image as compared to the original.

An important advantage of the invention lies in its great flexibility, since the functional pattern of modification may be altered in a few seconds, merely by changing the masking element. There is no requirement for complex or specialized feedback circuits, or indeed, for feedback circuits of any kind. A substantial portion of the available area of the electro-optical transducer is utilized for each portion of the signal, which permits accuracy in the output intelligence signal.

These and other objects and advantages of the invention may best be understood by reference to the following detailed description of certain preferred embodiments thereof, and to the accompanying drawings, in which:

Fig. 1 is a block diagram of a facsimile system comprising one embodiment of the invention;

Figs. 2A, 2B, and 2C are front views of different forms of tone-control masks which may be incorporated in the apparatus of Fig. 1;

Fig. 3 is a graphical representation of the input-output characteristics of the facsimile system of Fig. 1 using the various masks of Figs. 2A, 2B, and 2C;

Fig. 4 illustrates the input voltage trains applied to the electro-optical transducer of Fig. 1;

Fig. 5 is a block diagram of a facsimile system comprising a second embodiment of the invention;

Fig. 6 shows the input voltage trains supplied to the cathode ray tube of Fig. 5;

Figs. 7A, 7B and 7C are detailed schematic representations of specific amplifier and multivibrator circuits suitable for use in the apparatus of Fig. 1;

Figure 8:
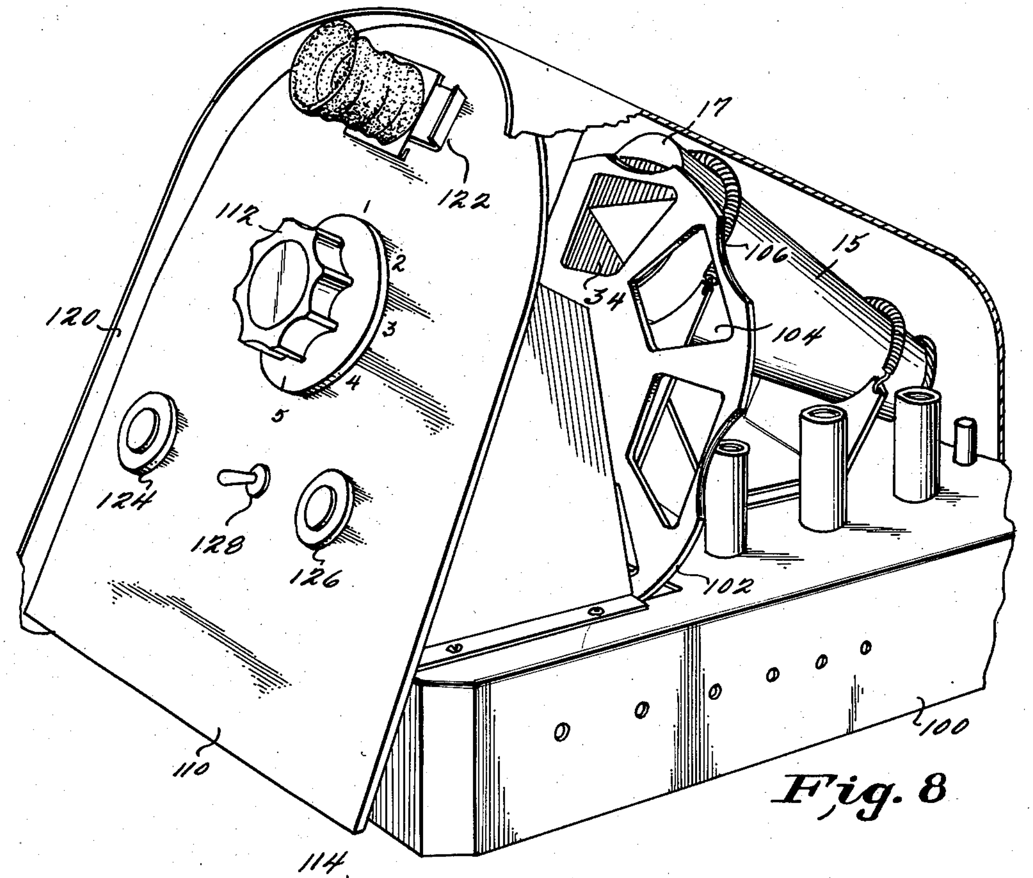
Fig. 8 is a perspective view of a physical embodiment of the invention arranged for rapid change of the functional pattern relating the input and output signals.

The present invention depends for its operation upon the reduction of a functional control pattern to a template or mask which has light-obscuring areas and light-transmitting areas. The transparent portions of this tone-control member are so arranged geometrically that when the mask is scanned by a beam of light, the light translated through it varies in accordance with the position of the light beam in relation to the light-transmitting areas. The position of the light beam or optical intelligence signal is controlled by an input signal, so that the output signal generated by a photo-sensitive device positioned in the path of the light translated through the mask represents a composite of the input signal as operated upon by the function defined by the mask. By using a cathode ray tube as the transducer for generating the optical intelligence signal, high scanning rates and high response speeds are made possible; in addition, the particular scanning systems described hereinafter in connection with the two illustrated embodiments of the invention permit utilization of a major portion of the screen area of the cathode ray tube, so that excellent accuracy may be obtained.

The facsimile system illustrated in Fig. 1 comprises a scanning device 10 including a photo-sensitive pickup device for scanning an original image to generate an electrical signal representative of the tone values in the image. Scanner 10 is coupled to a modulator 11; the modulator is also coupled to the output of a screen signal generator 12. Modulator 11 and screen generator 12 are both coupled to a tone-control system enclosed within dash outline 13. Tone-control system 13, which will be described in detail hereinafter, is in turn connected to an image reproduction system, here shown as an engraver 14, adapted to reproduce an image (not shown) representative of the original image.

As thus far described, the facsimile system of Fig. 1 is entirely conventional in form except for the tone-control system 13; accordingly, only a brief description of its general mode of operation will be included here. The pickup device 10 scans an image, which may comprise a photograph, picture, or other image, at a regular rate to develop a signal representative of the tone values of the image. In typical systems, the material bearing the image is mounted upon a cylinder so that it may be simultaneously rotated and moved linearly in relation to a pickup device to effect the desired scansion. The tone-value signal generated by the scanner is applied to circuit 11 and is employed therein to amplitude-modulate a carrier signal from the screen generator 12 to generate an electrical intelligence signal modulated in accordance with tonal values of the original image. This intelligence signal is translated through tone-control system 13 to engraver 14 and is utilized by the engraver to etch, deform, print upon, or otherwise modify a blank sheet of material (not shown) to form a reproduction of the original image. Usually, the material upon which the reproduced image is formed is also mounted upon a cylinder and is driven past a transducing head or etching instrument in synchronism with the movement of the original image in relation to scanner 10. A particularly useful and effective facsimile system of this general type is described in detail in Patent No. 2,575,546 for "Machine for Producing Screened Relief Pattern Plates," issued November 20, 1951, to J. A. Boyajean, Jr., and assigned to the same assignee as the present application; reference may be made to this patent for operational and constructional characteristics of a typical system in which the instant invention may be employed.

The tone-control system 13, which forms the heart of the present invention, comprises an electro-optical transducer here illustrated as a cathode-ray tube 15. Tube 15 includes the usual electron gun 16 mounted at one end of the tube envelope and a conventional luminescent screen mounted at the opposite end of the envelope and generally indicated by numeral 17. Gun 16, which may be entirely conventional in construction, may include, for example, an electron-emissive cathode 18, an intensity-control electrode 19, and first and second anodes 20 and 21. A horizontal deflection system comprising a pair of deflection plates 22 and 23 and a vertical deflection system including plates 24 and 25 are interposed between gun 16 and screen 17; the final anode for the tube may comprise the usual conductive coating upon the inner wall of the tube envelope intermediate the electron gun and the screen. Although the tube shown is of the electrostatically deflected type, other types of deflection control systems may be used equally well.

A known type of power supply 26 is included in tone-control system 13 and is connected to the various electrodes of transducer 15 to provide the necessary operating potentials for the tube. The power supply may also be connected to vertical deflection plate 25 and to horizontal deflector 23 to provide means for controlling the normal or undeflected trajectory of the electron beam of tube 15. The horizontal deflection system 22, 23 is coupled to modulator 11, preferably through an amplifier circuit 27. In the illustrated embodiment, a push-pull amplifier is employed, A.-C. coupled to the deflectors; however, single-ended circuits may be utilized for this purpose if desired. The vertical deflection system 24, 25 is similarly coupled to screen generator 12; an amplifier 28 may be incorporated in the vertical deflection circuit if desired. A multi-vibrator 29 is connected to screen generator 12 and is coupled to the control electrode 19 of gun 16; as in the case of the horizontal and vertical amplifier circuits, A.-C. coupling is preferred.

A photo-sensitive coupling device 30, preferably a photocell of the electron-multiplier type, is optically coupled to transducer 15; a lens system 31 is employed to collect light from screen 17 and to focus the light upon photocell 30. The operating potential for the photocell may be provided by connecting its cathode to power supply 26. Photocell 30 is electrically coupled to engraver 14, preferably by means of an output amplifier 32 intercoupling the photocell anode and the engraver. The illustrated embodiment is made complete with a tone-control member or mask 34 including opaque areas 35 and at least one transparent area 36 interposed in the system between luminescent screen 17 and photocell 30; it is the configuration of the transparent area 36 which determines the functional response pattern of the entire facsimile system, as will be made apparent in the succeeding operational explanation. Preferably, mask 34 is mounted in close proximity to screen 17, as illustrated, but it may be positioned at any point between the screen and the photocell.

When the facsimile system of Fig. 1 is placed in operation, the amplituded-modulated intelligence signal from modulator 11 is applied in push-pull to horizontal deflection plates 22, 23 to deflect the electron beam generated by gun 16. The screen or sweep signal from generator 12, which has the same frequency and phase as the intelligence signal, is simultaneously applied to vertical deflection system 24, 25. The normal operating potentials of the two deflection systems are adjusted by means of voltages supplied from power supply 26 to displace the electron beam in tube 15 and direct it toward a normal zero signal position beyond the periphery of screen 17. Thus, the beam is directed toward a spot indicated by cross 40 in Fig. 2A (which is a front view of one form of mask 34 and screen 17), when there is no signal on the deflectors. The sweep signal from generator 12 provides for constant-frequency and constant-amplitude deflection of the beam in the vertical direction, whereas the magnitude of the horizontal deflection varies in accordance with the tone-value signal derived by scanner 10 and modulated with the screen signal in circuit 11. Accordingly, the beam traces a series of lines upon screen 17, the angle of the moving line trace from the vertical being determined by the tone values in the scanned image, and a position-modulated optical intelligence signal is developed on screen 17. The term "position-modulated optical signal," as used throughout this specification and in the appended claims, may be defined as a periodically moving line of light which varies in position, either angularly or linearly, upon a field of predetermined dimensions such as the screen 17.

The amount of light translated from screen 17 through lens system 31 to photocell 30 is, of course, determined by the configuration and dimensions of transparent mask area 36. One typical and highly useful type of mask is illustrated in Fig. 1 and in elevation in Fig. 2A; the particular transparent area 36 illustrated therein comprises a step-function pattern which effectively "quantizes" the light output from the transducer as applied to the photocell. If the input signal to the horizontal deflection system is instantaneously of zero amplitude, a vertical trace extending upwardly from point 40 is produced on screen 17. If, on the other hand, the amplitude of the intelligence signal used to control the horizontal deflection increases, an angularly displaced line is developed, as indicated by dash line 41. The vertical trace provides a minimum light output through transparent area 36; the slanted trace a maximum. Moreover, the amount of light produced by horizontal deflection voltages of intermediate values varies in discrete steps, due to the mask configuration, so that a stepped input voltage-output light characteristic is established as shown by line 42 in Fig. 3. Since the output current from photocell 30 is determined by the amount of light reaching the cell from screen 17, the same relationship is established between the input electrical signal and the output supplied to engraver 14. The tone-control mask 34 thus modifies the optical intelligence signal developed on screen 17 in accordance with the functional pattern determined by the configuration and dimensions of its transparent area.

This effect may be utilized in a wide variety of ways. It may be employed to emphasize certain tonal values as compared to others; thus, the mask 34*b* illustrated in Fig. 2B may be employed if it is desired to stress the dark areas of an image, as indicated by the input-output characteristics for this particular mask, line 44 in Fig. 3. Or the middle tone values may be compressed and the highlights and dark tones expanded in accordance with the transfer characteristic illustrated by line 43 of Fig. 3; the particular mask 34*c* needed to achieve this effect in the facsimile system of Fig. 1 is shown in Fig. 2C. A negative or inverted effect may be achieved by altering the configuration of mask 34 so that the transparent area 36 permits more light to reach photocell 30 for small horizontal deflection angles than for larger horizontal deflection angles. In fact, virtually any effect desired may be obtained simply by altering the configuration of the transparent area of tone-control mask 34, since the transfer characteristic of tone-control system 13 is entirely dependent upon this mask. Thus, the optical or pictorial effect and interpretability of the image reproduced by engraver 14 or any similar device employed in the facsimile system may be modified at will in accordance with the desired functional pattern.

It is usually desirable to obtain an output intelligence signal having a fundamental frequency equal to that of the original modulated input signal. If the beam of the cathode ray tube is "on" during the entire signal cycle, however, it will scan screen 17 twice for each signal cycle and a double-frequency output signal will be obtained. Accordingly, a gating signal comprising a series of pulses having a frequency equal to that of the screen signal generated in circuit 12 (and therefore equal to the fundamental frequency of the input intelligence signal) is applied by multivibrator 29 to control electrode 19 of gun 16 to blank out the return traces of the beam. The frequency and phase relationships of all three signals are shown in Fig. 4, in which the sweep voltage applied to the vertical deflection system is shown by line 47, the input intelligence signal is illustrated by dash line 45, and the gating signal from multivibrator 29 is indicated by the pulses 46.

Fig. 5 illustrates another embodiment of the invention in which a different tone-control system 53 is employed in place of system 13 of Fig. 1. The conventional portions of the facsimile system may be identical with those of Fig. 1, and the optical system comprising lens 31 and photomultiplier 30, and the output amplifier 32, may also remain unchanged. In addition, the electro-optical transducer of the tone-control system, cathode ray tube 15, may be the same as in the previously-described system, and the general requirements for the horizontal deflection system and power supply 26 remain unchanged in all essential respects. In tone-control system 53, however, the vertical deflection circuit is changed in that deflectors 24 and 25 are no longer coupled to the screen generator; instead, the vertical deflection system of the cathode ray tube is coupled to multivibrator 59. As in the earlier embodiment, an amplifier 58 may be included in the vertical deflection circuit if desired. The control electrode 19 is coupled to the output of a second multivibrator 61 through a phase shifter 60.

The phase and frequency characteristics of the three input signals applied to the cathode ray tube in tone-control system 53 are illustrated in Fig. 6, in which the solid line 61 represents the intelligence signal supplied from modulator 11, the dash-line pulses 62 represent the gating signal, and pulses 63 correspond to the vertical sweep signal from multivibrator 59. This vertical sweep signal is timed so that the sharply-rising front of the pulses coincides with the peak amplitude of the intelligence signal. Consequently, the optical intelligence signal developed on luminescent screen 17 comprises a series of vertical traces, the horizontal displacement of each trace upon the screen being determined by the instantaneous amplitude of the intelligence signal applied to deflection system 22, 23.

A mask or tone-control member 64 having opaque areas 65 and at least one transparent area 66 is interposed between screen 17 and lens system 31 and is employed to modify the amount of light which reaches photocell 30 in much the same manner as mask 34 of Fig. 1. Of course, the configuration of transparent area 66 must be different from that of aperture 36 if the same function pattern is desired for the output signal, since the embodiment of Fig. 5 utilizes displacement-modulation of the series of lines constituting the optical intelligence signal instead of angular position modulation. In all other respects, the two tone-control systems are fully equivalent.

Tone-control systems 13 and 53 are by no means limited in utility to the facsimile systems illustrated. For example, they may be employed to convert any intelligence signal to digital or quantized form for use in computors or other specialized apparatus. Generally speaking, they may be used to advantage in any application in which it is desirable or necessary to operate upon a signal in accordance with a predetermined functional pattern, particularly when that pattern is available only in the form of empirical data or as a relatively complex mathematical function.

Fig. 7*A* shows the particular circuits employed for vertical amplifier 28 and multivibrator 29 in one version of the facsimile system of Fig. 1. The vertical amplifier 28 is a paraphase type and converts the input signal to push-pull output. This amplifier gives a balanced output of low harmonic content. Multivibrator 29 is of the monostable type being energized for a complete cycle for each input pulse. The output is an unsymmetrical square wave of fast rise time as indicated by waveform 46, Fig. 4. Similarly, Figs 7*B* and 7*C* provide representative schematic diagrams of the circuits of horizontal amplifier 27 identical to 28 and output amplifier 32 used in the same device. Output amplifier 32 is of the narrow bandpass type utilizing the parallel T filter network in the feedback loop. Its function is to shape the pulses received from photocell 30 into a semblance of a sine wave for driving the reproducer circuit.

The cathode ray tube 15 used in this particular device, which performed satisfactorily in all respects, was a type 3WP15, a three-inch screen tube using the short-duration P–15 phosphor and electrostatic deflection control. Tubes exhibiting a relatively short screen decay time are, of course, desirable for relatively high-frequency signal processing, since any residual glow present from one trace during the next sweep cycle will tend to distort the output signal. It will be understood that the specific circuits shown in Figs. 7*A*-7*C* are included herein solely for purposes of explanation and by no means by way of limitation, since the construction of the individual circuits may be varied to suit the preference of the designer and the requirements of different types of intelligence signals.

In some applications, it may be desirable to change the functional pattern applied to the optical intelligence signal to meet varying requirements or to achieve special effects in the output signal. This substitution of modification patterns may be readily accomplished by removably mounting the mask 34 in a receptacle or holder 39 (see Fig. 1) to permit rapid replacement with another similar mask comprising another functional pattern. Similarly, a series of masks of different functional characteristics may be mounted on a rotary support member to permit rapid switching between a number of different output patterns if desired.

Figure 9:
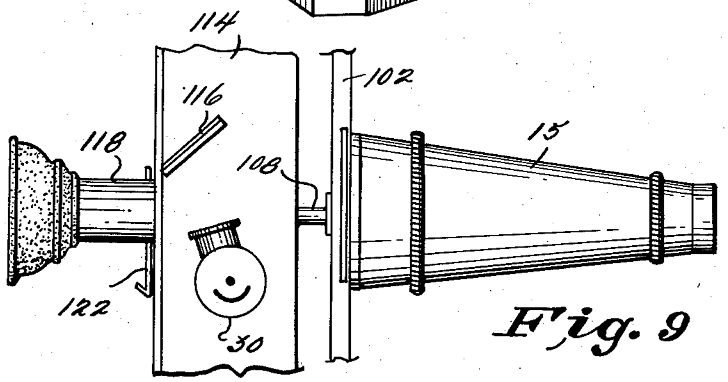
Fig. 9 is a view of a portion of Fig. 8 from above, showing schematically the arrangement of optical parts.

Figs. 8 and 9 show in two views a physical arrangement of apparatus in which such a provision is made for the rapid substitution of one of the functional control masks for another. As an additional feature, this embodiment of the invention provides for visual observation of the mask which is in use, so that by means of convenient controls the operator may make any necessary adjustments to ensure that the open or transparent parts of the mask are fully scanned by the cathode ray tube in order that the desired functional relationship will be obtained at the output of the device.

In Fig. 8, numeral 15 again denotes the cathode ray tube, the same being mounted upon a chassis 100 within or on which are carried the electronic components shown, for example, within the dashed outline 13 of Fig. 1, or the dashed outline 53 of Fig. 5. It will be understood that insofar as this physical embodiment is concerned, the particular nature of the circuitry itself is of no great significance.

Disposed forwardly of the face 17 of tube 15 is a wheel or disk 102 around whose periphery are located apertures or windows such as 104 each accessible as by a slot 106 opening to the outer surface of the wheel. A typical mask 34 is shown inserted in that window aperture which is in front of the face of the tube. As better shown in Fig. 9, which is a fragmentary plan view of part of Fig. 8, the wheel 102 is supported from the chassis 100 as by a shaft 108, which passes through the front panel 110 and terminates in a knob 112.

Rotation of the knob 112 enables any one of several masks to be disposed in front of the complete face 17, and any convenient detent means may be utilized to ensure precise positioning of the desired mask.

Upon a shelf 114 or otherwise supported as from the front panel 110, is the photocell or photomultiplier 30, and any desired optical system for collecting light from the tube face 17 through the mask. To permit visual observation of the traces through the mask, a reflector 116 is mounted so that the photocell sees the tube face by reflection. It is thus made possible to place an optical viewing device 118 in position to permit inspection of the mask and tube face from the front panel 110. A cover 120 for the apparatus serves to prevent extraneous light from reaching the photocell 30, and a sliding shutter 122 is preferably provided at the eyepiece to permit complete closure of the apparatus when the display is not being observed.

In order that the operator may make the necessary adjustments of the electronic components to satisfy the conditions mentioned above, controls such as 124 and 126 are provided on the front panel. These may, for example, be the gain control for the horizontal amplifier 27 of Fig. 1 and the horizontal positioning control for positioning the zero location of the trace. An on-off switch is indicated at 128.

It is to be understood that the invention has been disclosed herein in considerable detail, for purposes of example, and that the invention is not to be restricted to these or any details of construction and arrangement except insofar as required by the scope of the appended claims.

I claim:

1. A facsimile system comprising: photo-electronic means for scanning an original image to generate an electrical intelligence signal of fixed frequency, amplitude modulated in accordance with tonal values of said image; an electro-optical transducer, coupled to said photo-electronic scanning means, for converting said intelligence signal into a position-modulated optical intelligence signal comprising a luminous line whose position is defined by the instantaneous amplitude of said intelligence signal; an image reproduction system, optically coupled to said transducer, for utilizing said optical intelligence signal to reproduce an image representative of said original image; and a tone-control member, comprising an optical mask having a geometrical pattern of opaque and transparent portions, interposed between said transducer and said image reproduction system, for modifying said optical intelligence signal in accordance with a preselected functional pattern to vary the optical illusion and interpretability of said reproduced image as compared to said original image.

2. A facsimile system comprising: photo-electronic means for scanning an original image to generate an electrical intelligence signal of fixed frequency, amplitude modulated in accordance with tonal values of said image; an electro-optical cathode-ray transducer including an electron gun, a deflection system, and a luminescent screen; means for applying said electrical intelligence signal to said deflection system of said transducer to generate a position-modulated optical intelligence signal on said luminescent screen, in the form of a luminous line whose position corresponds to the instantaneous amplitude of said intelligence signal; an image reproduction system, optically coupled to said transducer, for utilizing said optical intelligence signal to reproduce an image representative of said original image; and a tone-control member, comprising an optical mask having a geometrical pattern of opaque and transparent portions, interposed between said transducer screen and said image reproduction system, for modifying said optical intelligence signal in accordance with a preselected functional pattern to vary the optical illusion and interpretability of said reproduced image as compared to said original image.

3. A facsimile system comprising: photo-electronic means for scanning an original image to generate an electrical intelligence signal of predetermined frequency amplitude-modulated in accordance with tonal values of said image; an electro-optical cathode-ray transducer including a luminescent screen, an electron gun for projecting a beam of electrons to impinge upon said screen, and a pair of deflection systems for deflecting said beam across said screen in two co-ordinate directions; means for applying a sweep signal, having a frequency equal to the frequency of said electrical intelligence signal, to a selected one of said deflection systems; means for applying said electrical intelligence signal to the other of said deflection systems of said transducer to develop on said luminescent screen a position-modulated linear optical intelligence signal controlled conjointly by said sweep and electrical intelligence signals; an image reproduction system, optically coupled to said transducer, for utilizing said optical intelligence signal to reproduce an image representative of said original image; and a tone-control mask, having a geometrical pattern of opaque and transparent portions, interposed between said transducer screen and said image reproduction system, for modifying the amplitude of said optical intelligence signal in accordance with a preselected functional pattern to vary the optical illusion and interpretability of said reproduced image as compared to said original image.

4. A facsimile system comprising: photo-electronic means for scanning an original image to generate an electrical intelligence signal of predetermined frequency modulated in accordance with tonal values of said image; an electro-optical cathode-ray transducer including a luminescent screen, an electron gun for projecting a beam of electrons to impinge upon said screen, and a pair of deflection systems for deflecting said beam across said screen in two co-ordinate dimensions; means for applying a sweep signal, having a frequency equal to the frequency of said electrical intelligence signal, to a selected one of said deflection systems; means for applying said electrical intelligence signal to the other of said deflection systems of said transducer to develop on said luminescent screen a position-modulated optical intelligence signal controlled conjointly by said sweep and electrical intelligence signals; means for applying to said electron gun a gating signal, comprising a series of pulses having a repetition frequency equal to the frequency of said electrical intelligence signal, to restrict operation of said transducer to predetermined portions of each cycle of said electrical intelligence signal; an image reproduction system, optically coupled to said transducer, for utilizing said optical intelligence signal to reproduce an image representative of said original image; and a tone-control mask, interposed between said transducer screen and said image reproduction system, for modifying said optical intelligence signal in accordance with a preselected functional pattern to vary the optical illusion and interpretability of said reproduced image as compared to said original image.

5. A facsimile system comprising: photo-electronic means for scanning an original image to generate an electrical intelligence signal of fixed frequency, amplitude modulated in accordance with tonal values of said image; an electro-optical cathode-ray transducer including a luminescent screen, an electron gun for projecting a beam of electrons to impinge upon said screen, and a deflection system for deflecting said beam across said screen; means for applying said electrical intelligence signal to said deflection system to generate a position-modulated optical intelligence signal on said luminescent screen, in the form of a luminous line whose position corresponds to the instantaneous amplitude of said intelligence signal; an image reproduction system, optically coupled to said transducer, for utilizing said optical intelligence signal to reproduce an image representative of said original image; a tone-control mask, including a light transparent area having a configuration definitive of a predetermined function in relation to the instantaneous position of said optical intelligence signal when said mask is mounted in a preselected position in relation to said screen for modifying said optical intelligence signal in accordance with said function to vary the optical illusion and interpretability of said reproduced image as compared to said original image; and means for removably supporting said mask in said preselected position.

6. A facsimile system comprising: photo-electronic means for scanning an original image to generate an electrical intelligence signal modulated in accordance with tonal values of said image; an electro-optical cathode-ray transducer including a luminescent screen, an electron gun for projecting a beam of electrons to impinge upon said screen, and a deflection system for deflecting said beam across said screen; means for applying a constant unidirectional potential to said deflection system to direct said beam toward a normal position beyond the periphery of said screen; means for applying said electrical intelligence signal to said deflection system to periodically deflect said beam from said normal position across said screen to generate a position-modulated optical intelligence signal on said screen, in the form of a luminous line whose position corresponds to the instantaneous amplitude of said intelligence signal; an image reproduction system, optically coupled to said transducer, for utilizing said optical intelligence signal to reproduce an image representative of said original image; and a tone-control member, comprising an optical mask having a geometrical pattern of opaque and transparent portions, interposed between said transducer screen and said image reproduction system, for modifying said optical intelligence signal in accordance with a preselected functional pattern to vary the optical illusion and interpretability of said reproduced image as compared to said original image.

7. A tone control system for modifying an amplitude-modulated electrical intelligence signal of predetermined frequency in accordance with a preselected functional pattern, said system comprising: an electro-optical cathode-ray transducer including a luminescent screen, an electron gun for projecting a beam of electrons to impinge upon said screen, and a pair of deflection systems for deflecting said beam across said screen in two co-ordinate directions; means for applying a sweep signal, having a frequency equal to the frequency of said electrical intelligence signal, to a selected one of said deflection systems; means for applying said electrical intelligence signal to the other of said deflection systems in phase with said sweep signal to develop on said luminescent screen a position-modulated optical intelligence signal controlled conjointly by said sweep and electrical intelligence signals; a photo-sensitive coupling device, optically coupled to said transducer, for generating a second electrical intelligence signal representative of said optical intelligence signal; and a tone-control mask, including a light-transparent area definitive of said functional pattern in relation to the instantaneous position of said optical intelligence signal, interposed between said transducer screen and said coupling device.

8. A tone-control system for modifying an amplitude-modulated electrical intelligence signal of predetermined frequency in accordance with a preselected functional pattern, said system comprising: an electro-optical cathode-ray transducer including a luminescent screen, an electron gun for projecting a beam of electrons to impinge upon said screen, and a pair of deflection systems for deflecting said beam across said screen in two co-ordinate directions; means for applying a sinusoidal sweep signal, having a frequency equal to the frequency of said electrical intelligence signal, to a selected one of said deflection systems; means for applying said electrical intelligence signal to the other of said deflection systems in phase with said sweep signal to develop on said luminescent screen an angular-position-modulated optical intelligence signal controlled conjointly by said sweep and electrical intelligence signals; a photo-sensitive coupling device, optically coupled to said transducer, for generating a second electrical intelligence signal representative of said optical intelligence signal; and a tone-control mask, including a light-transparent area definitive of said functional pattern in relation to the instantaneous angular position of said optical intelligence signal, interposed between said transducer screen and said coupling device.

9. A tone-control system for modifying an amplitude-modulated electrical intelligence signal of predetermined frequency in accordance with any one of a series of preselected functional patterns, said system comprising: an electro-optical cathode-ray transducer including a luminescent screen, an electron gun for projecting a beam of electrons to impinge upon said screen, and a pair of deflection systems for deflecting said beam across said screen in two co-ordinate directions; means for applying a sweep signal, having a frequency equal to the frequency of said electrical intelligence signal, to a selected one of said deflection systems; means for applying said electrical intelligence signal to the other of said deflection systems in phase with said sweep signal to develop on said luminescent screen a position-modulated optical intelligence signal controlled conjointly by said sweep and electrical intelligence signals; a photo-sensitive coupling device, optically coupled to said transducer, for generating a second electrical intelligence signal representative of said optical intelligence signal; a series of tone-control masks, each including a light-transparent area definitive of one of said series of functional patterns in relation to the instantaneous position of said optical signal when mounted in a preselected position in relation to said screen; and means for removably supporting said masks in said preselected position.

10. A tone-control system for modifying an amplitude-modulated electrical intelligence signal of predetermined frequency in accordance with a preselected functional pattern, said system comprising: an electro-optical cathode-ray transducer including a luminescent screen, an electron gun for projecting a beam of electrons to impinge upon said screen, and a pair of deflection systems for deflecting said beam across said screen in two co-ordinate directions; means for applying a sweep signal, comprising a series of pulses having a repetition frequency equal to the frequency of said electrical intelligence signal, to a selected one of said deflection systems; means for applying said electrical intelligence signal to the other of said deflection systems in phase with said sweep signal to develop on said luminescent screen a displacement-position-modulated optical intelligence signal controlled conjointly by said sweep and electrical intelligence signals; a photo-sensitive coupling device, coupled to said transducer, for generating a second electrical intelligence signal representative of said optical intelligence signal; and a tone-control mask, including a light-transparent area definitive of said functional pattern in relation to the instantaneous displacement of said optical intelligence signal, interposed between said transducer screen and said coupling device.

11. In combination, a cathode-ray tube having a display screen, means for producing on said screen a luminous display whose dimensions correspond to an input signal, a photoelectric cell positioned to receive light from said screen, an optical mask having geometrical light modifying properties interposed between said screen and said cell, and a visual observation device positioned to view the face of said screen through said mask without interfering with the energization of said photoelectric cell.

12. The combination of claim 11 including an opaque casing containing said tube, said cell and said mask, and in which said observation device is mounted in a wall of said casing.

13. The combination of claim 12 including shutter means for closing the light path through said observation device.

14. Apparatus for converting an input signal of a given frequency and variable amplitude to a modified form having the same frequency and different instantaneous amplitude values related to the original instantaneous amplitude values by a selected functional relationship, and for delivering the modified signals to an output circuit, comprising a cathode-ray tube having a display screen, means for controlling said tube in accordance with the input signal to provide a luminous display whose position on the screen is characteristic of the input signal, means mounting a plurality of light-modifying masks, each having a selected pattern of opaque and transparent portions, in position to be shifted selectively before said screen, and photoelectric means arranged to be responsive to the light of said display passing through a selected mask to generate an output signal related to the input signal as modified by the selected mask pattern.

15. Apparatus in accordance with claim 14, in which the means mounting said masks comprises a rotatable wheel, and detent means for retaining said wheel releasably in selected positions.

References Cited in the file of this patent

UNITED STATES PATENTS

| | | |
|---|---|---|
| 2,200,095 | Marton | May 7, 1940 |
| 2,447,985 | Mass | Aug. 24, 1948 |
| 2,489,883 | Hecht | Nov. 29, 1949 |
| 2,557,691 | Rieber | June 19, 1951 |